Patented Sept. 8, 1931

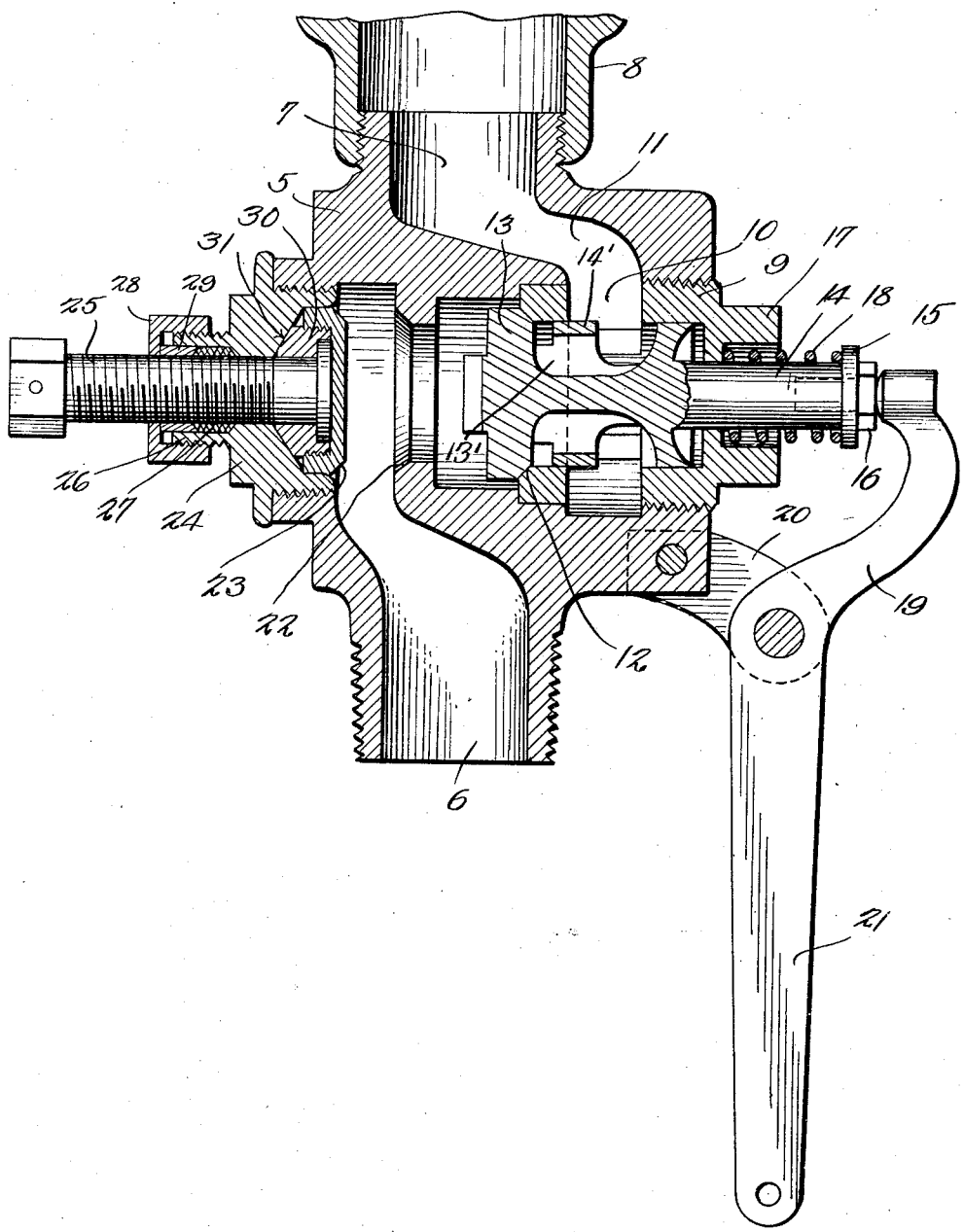

1,822,230

UNITED STATES PATENT OFFICE

KARL F. McJILTON, OF MOBERLY, MISSOURI

VALVE

Application filed June 28, 1927. Serial No. 202,055.

This invention has reference to valve construction, and more particularly to a valve construction especially designed for use in controlling the passage of fluid to a whistle or the like.

The primary object of the invention is to provide means whereby the valve may be removed and reseated when the same becomes worn or otherwise rendered inoperative, without the necessity of cutting off the fluid for operating the whistle at its source of supply.

Another object of the invention is to provide a device of this character which may be readily and easily operated, and one which may be readily and easily removed and replaced.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

The figure illustrates a sectional view through a valve and valve body constructed in accordance with the invention.

Referring to the drawing in detail, the valve body is indicated generally by the reference character 5 and is provided with an inlet opening 6 and an outlet opening 7. The valve body is supplied with threads to cooperate with the threads of the whistle, which in the present instance is employed in connection with the valve body, the base of the whistle being indicated by the reference character 8.

Removably mounted within the valve body is a valve cage 9 which is formed with an opening 10 communicating with the outlet bore 11 of the valve body that communicates with the outlet opening 7 so that fluid such as air or steam may pass through the valve body.

At one end of the valve cage 9 is a valve seat 12 that is engaged by the valve member 13 to normally cut off the passage of fluid through the valve body to the whistle. This valve member 13 is formed with a valve stem 14 that extends beyond the valve body, the stem being supplied with a washer 15 held in position by means of the threaded bolt 16.

Forming a part of the valve cage is a flange 17 that is spaced from the valve stem 14 to accommodate the coiled spring 18, which surrounds the valve stem, the coiled spring acting to normally close the valve 13. This valve 13 is formed with lateral cut away portions defining passageways 13′ and providing a guide band 14′ to engage the valve cage to hold the valve in direct alignment.

A suitable valve operating lever indicated at 19 is pivotally supported by means of the arm 20 and as shown, the lever 19 has one end thereof contacting with the head of the threaded bolt 16 so that when the handle 21 of the lever is moved outwardly, the valve will be moved inwardly or away from its seat.

Extending into the valve body is a valve including a shank 25 threaded in the usual and well known manner so that the inner end of the shank may be moved towards and away from the valve seat 22.

Positioned on the valve shank is a nut 30 formed with threads to accommodate the threads of the valve member 23 which seats on the valve seat 22.

As shown, the nut 30 is also provided with a tapered portion to contact with the valve seat 31 formed in the valve bonnet 24, to the end that the valve shank 25 may be moved to a position as shown by the drawing, whereupon the valve stem or shank packing may be readily replaced.

It will also be seen that due to this construction all pressure on the shank packing will be relieved to increase the life of the same.

From the foregoing it will be seen that should it be necessary to remove the valve member 13 to regrind the cooperating surfaces thereof, it is only necessary to rotate the shank 25 to cause the valve 23 to seat at 22, thereby cutting off the supply of fluid through the valve body.

The valve cage 9 may now be removed and the cooperating faces of the cage 9 and valve 13 may be ground to insure a true seating of the valve.

I claim:

A valve comprising a valve housing having an inlet opening at one side, and an outlet opening at the opposite side, said housing having an enlarged bore providing a valve chamber, said enlarged bore being in communication with the inlet opening and outlet opening, a valve cage removably mounted in the bore and having a valve seat at its inner end, said valve cage being in communication with the inlet and outlet openings, a valve operating in the valve cage and adapted to move against one end of the valve cage to close the valve, said valve having cut away portions providing passageways, and a guide band engaging the valve housing to hold the valve in alignment within the valve housing, when the valve is in its open position, means for operating the valve, and an auxiliary valve for cutting off the passage of steam through the valve.

In testimony that I claim the foregoing as my own, I have hereto affixed my signature.

KARL F. McJILTON.